(12) United States Patent
Komlósi

(10) Patent No.: US 10,894,322 B2
(45) Date of Patent: Jan. 19, 2021

(54) ROBOT MOTION PLANNING

(71) Applicant: KUKA Hungária Korlátolt Felelősségű Társaság, Taksony (HU)

(72) Inventor: István Komlósi, Debrecen (HU)

(73) Assignee: KUKA Hungária Korlátolt Felelősségű Társaság, Taksony (HU)

( * ) Notice: Subject to any disclaimer, the term of this patent is extended or adjusted under 35 U.S.C. 154(b) by 299 days.

(21) Appl. No.: 15/982,596

(22) Filed: May 17, 2018

(65) Prior Publication Data

US 2018/0333850 A1 Nov. 22, 2018

(30) Foreign Application Priority Data

May 18, 2017 (EP) ..................................... 17000852

(51) Int. Cl.
*B25J 9/16* (2006.01)
*G05D 1/02* (2020.01)
*B25J 5/00* (2006.01)

(52) U.S. Cl.
CPC ............. *B25J 9/1664* (2013.01); *B25J 5/007* (2013.01); *B25J 9/162* (2013.01); *B25J 9/1666* (2013.01);
(Continued)

(58) Field of Classification Search
CPC ...... B25J 9/1676; B25J 9/1664; B25J 9/1666; B25J 9/1661; B25J 9/06; B25J 13/025; B25J 15/0004; B25J 15/0019; B25J 17/025; B25J 17/0291; B25J 18/00; B25J 19/0004; B25J 19/022; B25J 19/023; B25J 1/02; B25J 3/04; B25J 9/12; B25J 9/1612;
(Continued)

(56) References Cited

U.S. PATENT DOCUMENTS 6,804,580 B1 * 10/2004 Stoddard ................ B25J 9/1669
318/568.1
8,700,307 B1 4/2014 Zhao et al.
(Continued)

FOREIGN PATENT DOCUMENTS

DE 102015009815 A1 2/2017

OTHER PUBLICATIONS

Satapathy et al., A visible midpoint approach for point robot path planning in cluttered environment, 2012, IEEE, p. 1-4 (Year: 2012).*

(Continued)

*Primary Examiner* — McDieunel Marc
(74) *Attorney, Agent, or Firm* — Dorton & Willis, LLP

(57) ABSTRACT

A method for motion planning for at least one robot includes providing a start configuration comprising at least one start position and a destination configuration comprising at least one destination position for the robot, providing a motion of at least one obstacle in the workspace of the robot, the obstacle motion defining a position of the obstacle that varies over time, and determining a motion of the robot from its start configuration to its destination configuration. The robot motion definies a position of the robot over a time period from a start time to a destination time. The robot motion is determined such that at each point in time between the start and destination times a distance between the robot and the obstacle does not fall below a predetermined threshold.

16 Claims, 2 Drawing Sheets

(52) U.S. Cl.
CPC .......... *G05D 1/021* (2013.01); *G05D 1/0217* (2013.01); *G05B 2219/40476* (2013.01); *G05B 2219/49143* (2013.01); *Y10S 901/01* (2013.01); *Y10S 901/02* (2013.01)

(58) Field of Classification Search
CPC . B25J 9/162; B25J 9/163; B25J 9/1633; B25J 9/1671; B25J 9/1674; B25J 9/1679; B25J 9/1687; B25J 9/1689; B25J 9/1692; G05B 19/4061; G05B 2219/40497; G05B 2219/39091; G05B 2219/40201; G05B 2219/49157; G05B 2219/50391; G05B 2219/39298; G05D 1/0238; G05D 2201/0213; G05D 1/0274; G05D 1/0276; G05D 1/0212; G05D 1/0223; G06T 7/70; G06T 2207/30261; G01C 21/20; G01C 21/32; G01P 15/18; B60W 50/0097; B60W 60/001; B64C 2201/141; Y10S 901/01

See application file for complete search history.

(56) References Cited

U.S. PATENT DOCUMENTS

| | | | | |
|---|---|---|---|---|
| 2007/0030159 | A1* | 2/2007 | Stoev | G11B 19/04 340/669 |
| 2012/0197464 | A1* | 8/2012 | Wang | G06F 19/3418 701/2 |
| 2013/0184980 | A1 | 7/2013 | Ichikawa et al. | |
| 2013/0325244 | A1* | 12/2013 | Wang | B25J 9/1689 701/26 |
| 2015/0285644 | A1 | 10/2015 | Pfaff et al. | |
| 2019/0056743 | A1* | 2/2019 | Alesiani | G01C 21/005 |
| 2019/0146498 | A1* | 5/2019 | Balachandran | G06N 5/003 701/23 |

OTHER PUBLICATIONS

Banerjee et al., Path-planning of mobile agent using Q-learning and real-time communication in an unfavourable situation, 2012, IEEE, p. 89-94 (Year: 2012).*

Popa et al., Mobile robot navigation with obstacle avoidance capability, 2008, IEEE, p. 1225—(Year: 2008).*

Popa et al., Motion planning for a mobile robot, 2010, IEEE, pg. (Year: 2010).*

Miura et al., Mobile robot motion planning considering the motion uncertainty of moving obstacles, 1999, IEEE, p. 692-697 (Year: 1999).*

Miura et al., Modeling motion uncertainty of moving obstacles for robot motion planning, 2000, IEEE, p. 2258-2263 (Year: 2000).*

Ceccarelli et al., Avoiding moving obstacles: the forbidden velocity map, 2004, IEEE, p. 147-152 (Year: 2004).*

Chen et al., Trajectory planning for human host tracking and following of slave mobile robot on service-related tasks, 2011, IEEE, p. 2419-2420 (Year: 2011).*

Gao et al., Supporting adaptive learning in hypertext environment: a high level timed Petri net based approach, 2005, IEEE, p. 1-5 (Year: 2005).*

Senbaslar et al., Robust Trajectory Execution for Multi-Robot Teams Using Distributed Real-time Replanning, 2016, Internet, p. 1-15 (Year: 2016).*

European Patent Office; Search Report in related European Patent Application No. 17 000 852.8 dated Nov. 8, 2017; 9 pages.

* cited by examiner

ROBOT MOTION PLANNING

CROSS-REFERENCE TO RELATED APPLICATIONS

This application claims the benefit of priority under 35 U.S.C. § 119(a) to European Patent Application EP 17 000 852.8, filed May 18, 2017 (pending), the disclosure of which is hereby incorporated by reference in its entirety.

TECHNICAL FIELD

The present invention relates to a method and a system for planning motion(s) of one or more robots, in particular for performing said motion(s), an arrangement comprising one or more robots and such system, and a computer program product for carrying out such method.

BACKGROUND

U.S. Pat. No. 8,700,307 B1 discloses a method for optimizing a trajectory for a motion of a manipulator avoiding at least one stationary obstacle whose position does not change over time.

However, obstacles in the workspace of robots may be dynamic, i.e. their position over time may change. This applies in particular to mobile robots moving on a floor which may cross paths of various dynamic obstacles, in particular other mobile robots.

One object of the present invention is to improve performance of robots in environments with dynamic obstacles.

SUMMARY

The object is achieved in particular by a motion planning method, a method for operating robots based on motions planned as described herein, and a system and a computer program product for carrying out a method as described herein.

According to one embodiment of the present invention a motion for one robot or motions for more robots is/are planned. According to one embodiment of the present invention said motion(s) is/are performed by controlling the robot(s), in particular its/their drives, accordingly.

The robot or one or more of said robots respectively may (each) be a mobile robot comprising a platform or base respectively and drive means for moving said platform/base, in particular horizontally, in particular on a floor. According to one embodiment drive means may comprise one or more driven and/or steerable wheels, in particular omnidirectional wheels, crawler tracks or the like. On such platform/base there may be arranged at least one robotic arm of the (mobile) robot comprising one or more, in particular at least four, in particular at least six, in particular at least seven, (actuated) joints or axes respectively.

Accordingly, motion planning may comprise, in particular be, planning motion of such platform/base(s), i.e. horizontal motion(s).

According to one embodiment of the present invention a method for motion planning for the robot or one or more of said robots comprises the steps of:

Providing, in particular selecting and/or (pre)defining, in particular receiving, entering and/or parameterizing, a start configuration which comprises one (single) or more start position(s) and a destination configuration which comprises one (single) or more destination position(s)

for the robot or each of said robots respectively;

Providing, in particular selecting and/or (pre)defining, in particular receiving, entering and/or parameterizing, an, in particular horizontal, motion of one (single) or more (dynamic or moving) obstacle(s) in the workspace of the robot(s), said obstacle motion(s each) defining an, in particular horizontal, position of the obstacle varying over time respectively; and Determining a motion of the robot or each of said robots from its start to its destination configuration respectively, said robot motion(s each) defining an, in particular horizontal, position of the robot over a time period from an, in particular (robot) individual or common, start time to an, in particular (robot) individual or common, destination time respectively, wherein the motion of the or each robot is determined with the proviso or such that at each point in time between the robot's start and destination time an or each, in particular (even) the shortest, distance between the robot and the obstacle(s) does not fall below a predetermined, in particular selectable or fixed, threshold respectively which may be (at least) zero or positive, in particular may correspond to a resolution of a discretization, according to one embodiment.

A (horizontal) position may be (defined by) or comprise a one-, two- or three-dimensional position, in particular a horizontal position, of the obstacle or the robot, in particular its (mobile) platform or base, respectively, in particular a reference thereof, e.g. a center (point) or the like.

A distance between a robot and an obstacle may be (determined as) an, in particular shortest and/or Cartesian, in particular horizontal, distance between robot and obstacle, in particular their (horizontal), in particular actual or maximal, contours, or (virtual) shells fixed to robot or obstacle respectively, in particular between their horizontal projections. Thus (not falling below) a predetermined threshold being zero may in particular correspond to said contours or shells or projections not intersecting or overlapping each other respectively, (not falling below) a positive predetermined threshold in particular to them not even touching.

Determining motions of robots such that distances between their positions and the positions of (dynamic) obstacles do not fall below predetermined thresholds can advantageously reduce a risk of collisions between the robots and the moving obstacles, thus enhancing applicability of the robot(s).

According to one embodiment providing the destination configuration comprises providing, in particular selecting and/or (pre)defining, in particular receiving, entering and/or parameterizing, the destination time for the destination position or one or more of the destination positions of the destination configuration for the robot or each of said robots respectively.

By providing (specific) destination time(s) timely, in particular synchronized, arrival(s) and thus logistics may be improved according to one embodiment.

According to one embodiment the motion(s) of the robot(s) is/are determined employing, in particular within, an, in particular common or united, state space comprising an, in particular unique, time dimension t and one or more position dimensions, in particular two position coordinates (x, y) for (each of) the robot(s) respectively.

Thus according to one embodiment a time dimension t, in particular a unique time dimension for the (motion of the) robot(s) and obstacle(s), is provided or added to a space of position(s) of the robot(s).

By employing such state space or time dimension respectively motion planning reducing a risk of collisions between robots and moving obstacles can be carried out advantageously, in particular fast(er), (more) reliable and/or with small(er) computational capacity.

Additionally or alternatively a hyperspace comprising transitions $(x_i, y_j, t_k) \rightarrow (x_m, y_n, t_n)$ between states $(x_i, y_j, t_k)$, $(x_m, y_n, t_k)$ of said state space ("state transitions of said state space") may be employed. In particular the motion may be determined within such hyperspace and/or regarding state transitions of or within the state space as (super- or hyper) states itself respectively.

Said hyperspace, in particular transitions between its (super- or hyper) states, may be restricted based on or by, in particular selected and/or (pre)defined, in particular entered and/or parameterized, kinematical and/or dynamical constrains, in particular predetermined maximum (tolerable and/or performable) velocities, accelerations and/or jerks of the robot(s) or the like according to one embodiment respectively.

By employing such hyperspace kinematical and/or dynamical restrictions can be advantageously taken into account or observed respectively according to one embodiment. Additionally or accordingly employing a hyperspace comprising transitions between states of the robot(s) can improve computation of its/their motion, in particular with regard to a cost function.

According to one embodiment said state space and/or hyperspace, in particular its time dimension and/or its position dimension(s) and/or its transition dimension(s), is/are discretized, in particular according to a predetermined, in particular selected and/or (pre)defined, in particular parameterized, resolution, in particular into a (time and/or position and/or transition) grid, in particular in discrete (position/transition-time) cells.

By employing a discretized state space and/or hyperspace motion planning can be carried out advantageously, in particular fast(er), (more) reliable and/or with small(er) computational capacity.

According to one embodiment the method comprises the, in particular repetitive, steps of:

Determining a first motion of the robot(s) employing, in particular within, the state space and/or hyperspace discretized at a first resolution; and Determining a subsequent motion of the robot(s) employing, in particular within, a subspace of said state space and/or hyperspace in the vicinity of said first motion and/or discretized at a subsequent resolution finer than said first resolution respectively.

In particular a such-determined subsequent motion may itself again serve as a first motion of a (further) subsequent sequence of said steps according to one embodiment. A subspace of a (state or hyper)space may be a (real) subset, in particular sector, of said space according to one embodiment.

In other words, a state space and/or hyperspace may be narrowed to a vicinity of a determined motion and/or discretized finer, i.e. with a higher resolution, in particular in a vicinity of a determined motion when (iteratively) optimizing said motion.

Thereby motion planning can be carried out advantageously, in particular fast(er), (more) reliable and/or with small(er) computational capacity.

According to one embodiment determining the motion of the robot(s) comprises, in particular is, finding a trajectory within said, in particular common, state space and/or hyperspace avoiding cells occupied by the obstacle(s).

Thereby motion planning can be carried out advantageously, in particular fast(er), (more) reliable and/or with small(er) computational capacity.

According to one embodiment the, in particular said first and/or subsequent, motion(s) of the robot(s) is/are determined with the provisio or such that a defined one- or multi-dimensional cost function is optimized or by optimizing, in particular minimizing, said cost function respectively, and/or until a one- or multi-dimensional predefined criterion is met, in particular a predefined resolution and/or iteration and/or computational time threshold is reached, and/or employing a A* algorithm, in particular a Dynamic A* (D*), D* Lite, Constrained D*, DD* Lite, Field D*, in particular Multi-Resolution Field D*, algorithm, in particular as described in HART, P. E., NILSSON, N. J., RAPHAEL, B. (1968): A Formal Basis for the Heuristic Determination of Minimum Cost Paths, In. Systems Science and Cybernetics, IEEE Transactions on SSC4 Vol. 4 Issue 2, pp. 100-107, STENTZ, A. (T.) (1994): Optimal and Efficient Path Planning for Partially-Known Environments, Proceedings of the IEEE International Conference on Robotics and Automation (ICRA '94), pp. 3310-3317, KOENIG, S., AND LIKHACHEV, M. D*lite. In AAAI/IAAI (2002), pp. 476-483, A. Stentz. Constrained dynamic route planning for unmanned ground vehicles. In Proceedings of the 23rd Army Science Conference, 2002, G. Ayorkor Korsah, Anthony (Tony) Stentz, and M Bernardine Dias, "DD* Lite: Efficient Incremental Search with State Dominance," Twenty-First National Conference on Artificial Intelligence (AAAI-06), July, 2006, pp. 1032-1038, David Ferguson and Anthony (Tony) Stentz, "Field D*: An Interpolation-based Path Planner and Replanner," Proceedings of the International Symposium on Robotics Research (ISRR), October, 2005 or David Ferguson and Anthony (Tony) Stentz, "Multi-resolution Field D*," Proceedings of the International Conference on Intelligent Autonomous Systems (IAS), March, 2006 respectively, the content of which is incorporated by reference.

The cost function may depend on, in particular comprise or be, energy (consumption) of the robot(s), smoothness of the motion(s) and the like according to one embodiment.

By each of these features, in particular by combination thereof, motion planning can be carried out advantageously, in particular fast(er), (more) reliable and/or with small(er) computational capacity. In particular A* algorithm may in particular improve re-planning capabilities with regard to altering obstacle movements.

According to one embodiment the determined, in particular said first and/or subsequent, motion(s) of the robot(s) is/are smoothened, in particular by filtering.

This may provide advantageous motion(s), in particular when employing a discretized state space and/or hyperspace, in particular with low resolution.

According to one embodiment the motion(s) of the obstacle or one or more of the obstacles is/are altered, in particular by providing altered motion(s), in particular re-defining, in particular re-parameterizing, initially provided obstacle motion(s), and the motion(s) of the robot(s) is/are re-determined as described herein with respect to said altered obstacle motion(s).

Thus, the motion planning may be adapted to obstacles altering their motions, in particular online, i.e. while the robot motion(s) is/are planned or (already) performed.

As already emphasized before, a motion of a single robot or motions of one robot and one or more further robots may be planned as described herein, the latter with the additional constraint that the motions of these robots are—at least finally—determined such that at each point in time between start and destination time of the robots also an or each, in particular (even) the shortest distance between the robots does not fall below an, in particular the same, predetermined threshold, in particular a or the selectable or fixed, threshold respectively which may be (at least) zero or positive, in particular may correspond to a resolution of a discretization, according to one embodiment. A distance between a robot and further robot may be defined as described herein with respect to a distance between a robot and an obstacle.

In case of such multi-robot motion planning a (common) state space comprising a (unique) time dimension and position dimensions for each of the robots and/or a (common) hyperspace comprising state transitions of said (common) state space may be employed.

According to one embodiment determining the motions of the robots comprises, in particular is, finding a trajectory within said common state space and/or hyperspace avoiding cells occupied by the obstacle as well as cells corresponding to simultaneous positions of two or more robots.

Let in general $(x_{R1}(t), y_{R1}(t))$ denote positions of one (first) robot R1 at time t and $(x_{R2}(t), y_{R2}(t))$ denote positions of a further (second) robot R2 at time t. Then determining the motions of the robots R1, R2 between $t_0$ and $t_n$ may comprise finding a trajectory within common state space $\{x_{R1} \times y_{R1} \times x_{R2} \times y_{R2} \times t\}$ avoiding $(x_{R1}, y_{R1}) = (x_{R2}, y_{R2})$ at each $t \in [t_0, t_n]$ as well as each state occupied by an obstacle and/or employing the corresponding hyperspace. If said common state space and/or hyperspace is discretized than each discretized cell occupied by an obstacle as well as each discretized cell denoting or corresponding to a simultaneous position of two or more robots may be avoided while or in order to find(ing) the trajectory or determine the (coordinated) motions respectively.

Since the overall dimension of such (common) state space and/or hyperspace can be quite large, it can be advantageous to first determine initial motions of the robots from their start to their destination configurations individually, in particular independently of one another, as described before, in particular (just) such that for each robot at each point in time between start and destination time of the robot an or each, in particular (even) the shortest, distance between the robot and the obstacle(s) does not fall below a predetermined threshold, and to subsequently determine motions of two or more, in particular all, of said robots from their start to their destination configurations such that at each point in time between start and destination time of the robots (also) an or each, in particular the shortest, distance between robots does not fall below a, in particular the same, predetermined threshold based on, in particular starting with or in the vicinity of, said initial motions ("coordinated (robot) motions") respectively.

It turned out that such two-stage approach may significantly improve multi-robot motion planning, in particular with regard to computational speed and/or capacity.

Means in the sense of the present invention can be implemented by hardware and/or software. They may in particular comprise one or more, in particular digital, computational, in particular micro-processing, unit(s) (CPU(s)), preferably data and/or signal-connected to a storage and/or bus system, and/or one or more programs or program modules. The CPU(s) may be adapted to execute instructions which are implemented by or as a program stored in an, in particular common or distributed, storage system or medium respectively, receive input signals from one or more data buses and/or sent output signals to such data bus(es). A storage system may comprise one or more, in particular different, storage media, in particular optical, magnetic, solid state and/or other non-volatile media. The program(s) may be such that it/they implement(s) or can carry out the method(s) described herein respectively, such that the CPU(s) can execute the method steps and thus plan, in particular perform, the motion(s), in particular by controlling the robot(s) accordingly.

According to one embodiment one or more, in particular all, steps of the method as described herein are executed fully or partially automatic, in particular by the system or its means respectively.

According to one embodiment of the present invention a system is adapted, in particular with respect to hard- and/or software, for carrying out a method described herein and/or comprises:

Means for providing a start configuration comprising at least one start position and a destination configuration comprising at least one destination position for the robot;

Means for providing a motion of at least one obstacle in the workspace of the robot, said obstacle motion defining a position of the obstacle varying over time; and Means for determining a motion of the robot from its start configuration to its destination configuration, said robot motion defining a position of the robot over a time period from a start time to a destination time, such that at each point in time between start and destination time a distance between the robot and the obstacle does not fall below a predetermined threshold.

According to one embodiment the system or its means respectively comprises:

Means for providing the destination time for at least one destination position of the destination configuration; and/or Means for determining the robot motion employing a state space comprising a time dimension and at least one position dimension and/or a hyperspace comprising state transitions of said state space; and/or Means for discretizing said state space and/or hyperspace; and/or Means for, in particular repetitively, determining a first motion of the robot employing the state space and/or hyperspace discretized at a first resolution and determining a subsequent motion of the robot employing a subspace of said state space and/or hyperspace in the vicinity of said first motion and/or discretized at a subsequent resolution finer than said first resolution; and/or Means finding a trajectory within said state space and/or hyperspace avoiding cells occupied by the obstacle; and/or Means for determining the motion of the robot such that a defined cost function is optimized, until a predefined criterion is met and/or employing a A* algorithm; and/or Means for smoothing, in particular filtering, the determined motion of the robot; and/or Means for altering the motion of the obstacle in the workspace of the robot and re-determining the motion of the robot as described herein, in particular in the vicinity of its previously determined motion; and/or Means for providing a start configuration comprising at least one start position and a destination configuration comprising at least one destination position for at least one further robot and determining a motion of the further robot from its start to its destination configuration as described herein, wherein the motions of the robots are determined such that at each point in time between start and destination time of the robots a distance between the robots does not fall below a predetermined threshold; and/or Means for determining initial motions of the robots from their start to their destination configurations individually such that for each robot at each point in time between start and destination time of the robot a distance between the robot and the obstacle does not fall below a predetermined threshold, and determining coordinated motions of the robots from their start to their destination configurations such that at each point in time between start and destination time of the robots a distance between the robots does not fall below a predetermined threshold based on, in particular in the vicinity of, said initial motions; and/or Means for operating at least one robot comprising means for determining a motion of the at least one robot as described herein and controlling the at least one robot to perform said motion.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the present invention.

DETAILED DESCRIPTION

Figure 1:
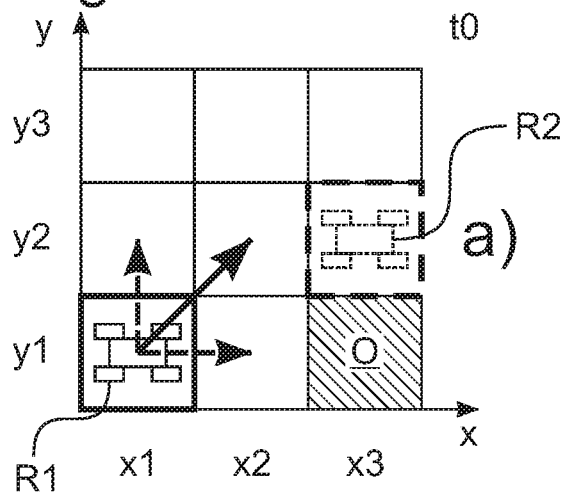
FIGS. 1a-d graphically illustrate steps of a method of motion planning for at least one robot according to an embodiment of the present invention.
Figure 1:
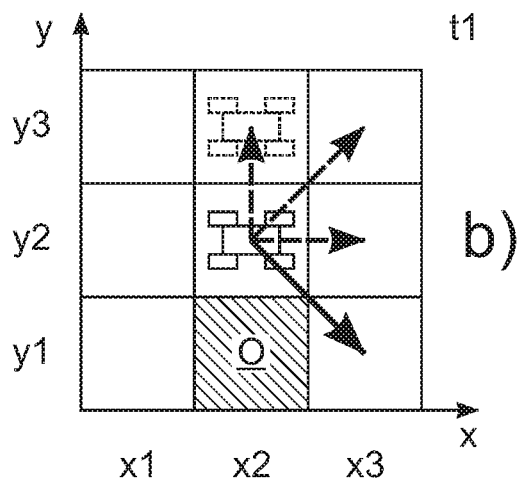
Figure 1:
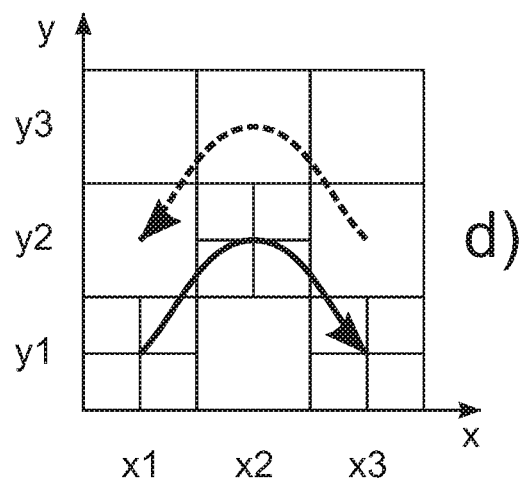
Figure 1:
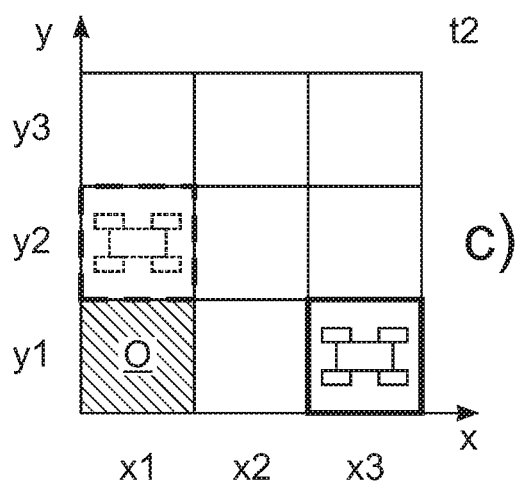
Figure 2:
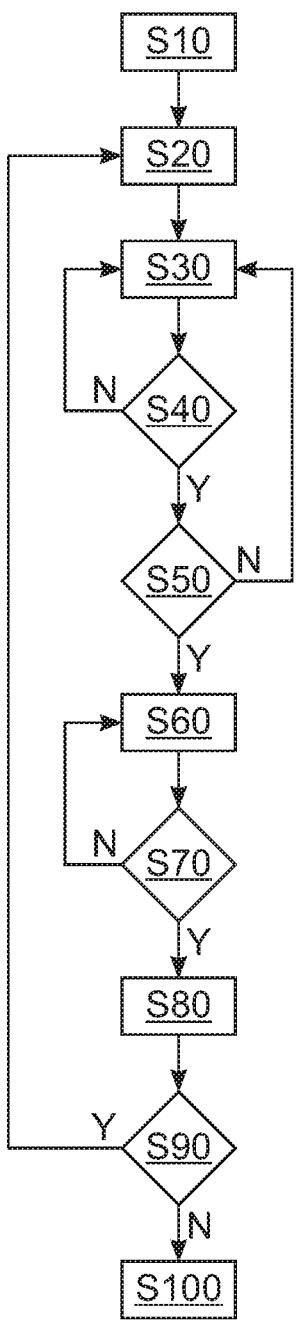
FIG. 2 is a flowchart illustrating the method of motion planning.
Figure 3:
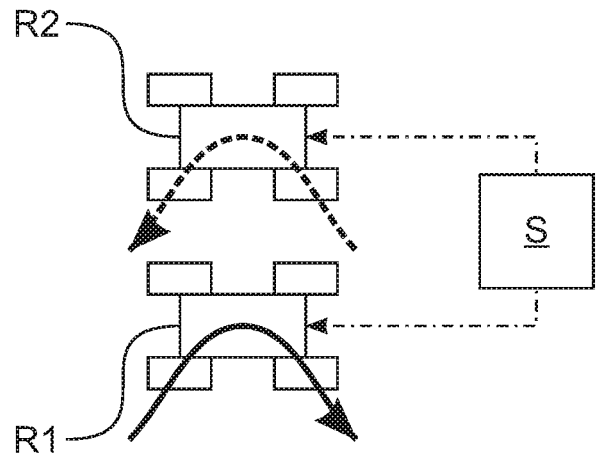
FIG. 3 depicts an arrangement comprising at least one robot and a system (for) carrying out the method.

FIGS. 1 and 2 show steps of a method of motion planning for one or two mobile robots R1, R2 of an arrangement by a system S of said arrangement (cf. FIG. 3) according to an embodiment of the present invention.

In a first step S10 start and destination configurations for mobile robot R1 are provided by a user, e.g. by entering corresponding values into system S. A horizontal start position (x1, y1) on a floor at a start time t0 and a horizontal destination position (x3, y1) at a predefined destination time t2 are indicated by bold frames in FIG. 1 a), c) and FIG. 4 respectively.

If a coordinated motion also of mobile robot R2 is to be planned then a start position (x3, y2) at start time t0 and a destination position (x1, y2) at destination time t2 are provided as well in step S10 as indicated in dashed lines in FIG. 1 a) and c) respectively.

Subsequently (cf. step S20), parallel or before, a linear motion of a dynamic obstacle O is provided between (x3, y1) at t0 and (x1, y1) at t2 as indicated by a shaded cell in FIG. 1 a)-c) and FIG. 4.

Figure 4:
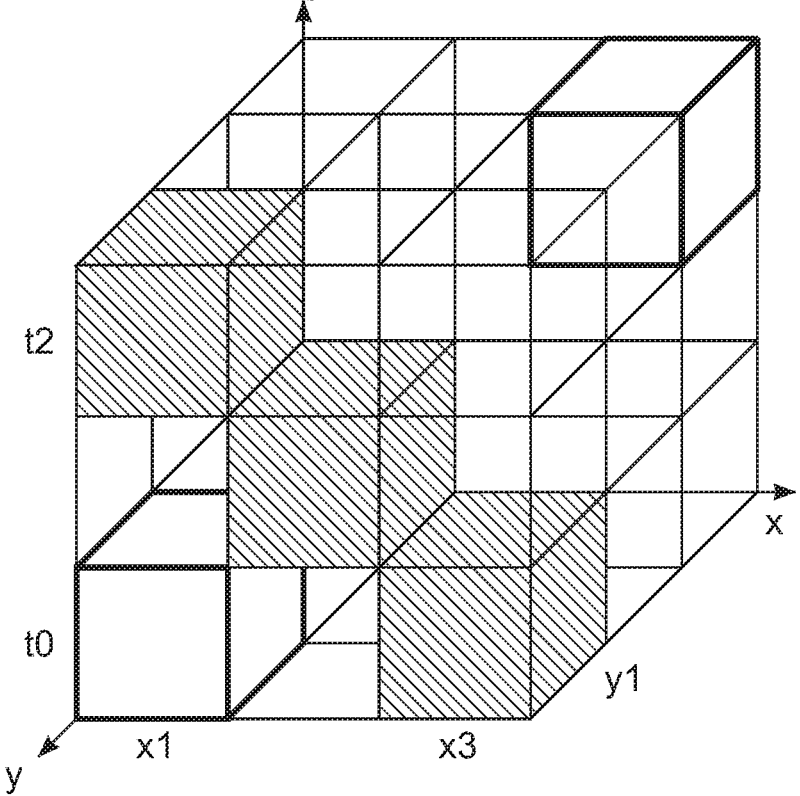
FIG. 4 illustrates a state space employed in the motion planning.

In step S30 the state space (x, y, t) is discretized at a first resolution as indicated by corresponding discrete cells of the horizontal floor at discrete times t0, t1 and t2 in FIG. 1 a)-c) and FIG. 4.

Next, a motion of mobile robot R1 is determined by an D* Lite algorithm such that cells occupied by robot R1 and obstacle O are not identical but neighbouring at least while minimizing energy consumption as a cost function in step S30.

Thereto transitions between states of said discretized state space are employed to satisfy predefined kinematical and dynamical restrictions as indicated by arrows in FIG. 1 a)-c). Just as a simple example for better understanding in FIG. 1 b) no immediate return from (x2, y2) to (x1, y1) is possible or taken into account respectively since the required reverse motion would exceed drive capability of the mobile robot R1.

Since energy consumption is employed as cost function, a certain contribution of energy consumption can be assigned to each such state transition which corresponds to a (super- or hyper)state of a hyperspace comprising state transitions of said state space (x, y, t). Thus the contribution of energy consumption can be assigned to corresponding super- or hyperstates of said hyperspace respectively, which allows for improved computation of the motion.

This first motion is schematically indicated by the sequence FIG. 1 a)-c). Determining said motion can be understood as finding a trajectory of minimal energy consumption connecting (x1, y1, t0) and (x3, y1, t2) while avoiding the cells (x3, y1, t0), (x2, y1, t1) and (x1, y1, t2).

This is illustrated by FIG. 4 showing said discretized state space with said cells (x3, y1, t0), (x2, y1, t1) and (x1, y1, t2) occupied by moving obstacle O (shaded in FIG. 4) and start and destination configuration of R1 (bold in FIG. 4).

In subsequent step S40 the resolution of the state space's discretization is increased in the vicinity of the motion determined in step S30 as indicated by FIG. 1d).

As long as a predefined threshold for the resolution of the state space or its discretization respectively has not yet been reached (S40: "N"), the method or system S respectively returns to step S30, determining a (further) subsequent motion of R1 within a state space which is (further) restricted to the vicinity of the foregoing (first) motion and discretized at the (further) increased resolution (cf. FIG. 1 d)).

If said criterion is met (S40: "Y"), the method or system S respectively proceeds with step S50, therein checking whether all robots' motions have been determined.

If—according to one embodiment—only robot R1's motion is to be planned, the method or system S respectively proceeds with step S60.

If—according to another embodiment—also motion of mobile robot R2 is to be planned then the method or system S respectively returns to step S30 and determines such motion as described before, starting again with the first resolution.

As one understands therefrom, those initial motions of robots R1, R2 are initially determined individually, in particular independently from one another, in steps S30-S50.

This results in an initial motion (x3, y2, t0)→(x2, y2, t1)→(x1, y2, t2) for R2 which thus would collide with R1 at its initial motion (x1, y1, t0)→(x2, y2, t1)→(x3, y1, t2).

Thus, starting with these initial motions of R1, R2, in step S60 coordinated motions are determined in step S60.

This may be implemented as described before with respect to the individual motions but within a common state space comprising the (discretized) unique time dimension t and position dimensions $(x_{R1}, y_{R1})$ for robot R1 and position dimensions $(x_{R2}, y_{R2})$ for robot R2 ($\{x_{R1} \times y_{R1} \times x_{R2} \times y_{R2} \times t\}$). Thus the coordinated motions are determined as a trajectory in said common state space with higher dimension $\Re^5$ in which states or discrete cells $(x_{R1}=a, y_{R1}=b, x_{R2}=a, y_{R2}=b, t=c)$ are avoided or forbidden respectively as are states or discrete cells occupied by the obstacle(s).

Again such coordinated motions may be iteratively optimized until a predefined criterion is met (S70: "Y"), e.g. a maximum computing time has been lapsed or the like.

In step S80 said coordinated motions are smoothened by filtering as indicated in FIG. 1 d)).

In step S90 the method or system S respectively checks whether the motion of obstacle O has altered. If so (S90: "Y"), motions of R1 (and R2 as the case may be) are re-planed as described above with respect to steps S20-S80, starting with the already determined motions as a basis.

Otherwise (S90: "N") the planned motion(s) is/are performed by controlling the robots R1, R2 accordingly (cf. step S100 and FIG. 3).

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

In particular for easier understanding determining the motions has been illustrated in particular with respect to the state space itself. However, as already explained before, its hyperspace comprising the state transitions may be employed additionally or alternatively.

For example instead of start position (x1, y1, t0) possible state transitions $\{(x1, y1, t0) \rightarrow (x2, y1, t1), (x1, y1, t0) \rightarrow (x1, y2, t1), (x1, y1, t0) \rightarrow (x2, y2, t1)\}$ may be employed and the like.

Then for example a state transition $(x2, y2, t1) \rightarrow (x1, y1, t2)$ corresponding to a reverse motion exceeding drive capabilities corresponds to a (super- or hyper)state of such hyperspace. By avoiding or forbidding said (super- or hyper) state the corresponding dynamic constraint can easily be observed.

Additionally, energy consumption required for e.g. a state transition $(x1, y1, t0) \rightarrow (x2, y2, t1)$ can be assigned to the corresponding (super- or hyper)state, thus facilitating computation of the cost function.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE NUMBERS

● obstacle
R1 mobile robot
R2 further mobile robot
S system

What is claimed is:

1. A method for motion planning for at least one robot having a plurality of axes that are actuated by respective drives and a microprocessor adapted to control the drives, the method comprising:

providing a start configuration of a first robot comprising at least one start position;
providing a destination configuration of the first robot comprising at least one destination position;
providing information for a motion of at least one obstacle in the workspace of the first robot, the obstacle motion information defining a position of the obstacle varying over time;
determining with the microprocessor a motion of the first robot from the start configuration to the destination configuration, the robot motion defining a position of the first robot over a time period from a start time to a destination time;
wherein the robot motion is determined such that at each point in time between the start time and the destination time, a distance between the first robot and the obstacle does not fall below a predetermined threshold;
wherein determining the motion of the first robot comprises employing at least one of:
a state space comprising a time dimension and at least one position dimension, or
a hyperspace comprising state transitions of the state space;
wherein at least one of the state space or the hyperspace is discretized;
determining a first motion of the first robot employing at least one of the state space or the hyperspace discretized at a first resolution; and
determining a subsequent motion of the first robot employing a subspace of at least one of the state space or the hyperspace, wherein the subspace is at least one of in the vicinity of the first motion, or is discretized at a subsequent resolution finer than the first resolution.

2. The method of claim 1, wherein providing the destination configuration comprises providing the destination time for at least one destination position of the destination configuration.

3. The method of claim 1, wherein determining the first motion and the subsequent motion is performed iteratively.

4. The method of claim 1, wherein determining the motion of the first robot comprises finding a trajectory within at least one of the state space or the hyperspace that avoids cells occupied by the obstacle.

5. The method of claim 1, wherein at least one of:
the motion of the first robot is determined such that a defined cost function is optimized;
the motion of the first robot is determined until a predefined criterion is met; or
the motion of the first robot is determined employing an A* algorithm.

6. The method of claim 1, further comprising smoothing the determined motion of the first robot.

7. The method of claim 6, wherein smoothing the determined motion of the first robot comprises filtering the determined motion.

8. The method of claim 1, further comprising:
altering the motion of the obstacle in the workspace of the first robot; and
redetermining the motion of the first robot;
wherein the robot motion is redetermined such that at each subsequent point in time, a distance between the first robot and the obstacle moving according to the altered motion does not fall below the predetermined threshold.

9. The method of claim 8, wherein redetermining the motion of the first robot comprises redetermining the motion of the first robot in the vicinity of the previously determined motion of the robot.

10. The method of claim 1, further comprising:
providing a start configuration comprising at least one start position for at least a second robot;
providing a destination configuration comprising at least one destination position for the at least one second robot; and
determining a motion of the second robot from the start configuration to the destination configuration according to one of the preceding claims;
wherein the motions of the first and second robots are determined such that, at each point in time between a start time and a destination time of the first and second robots, a distance between the first and second robots does not fall below a predetermined threshold.

11. The method of claim 10, further comprising:
determining initial motions of the first and second robots from the respective start configuration to the destination configuration, individually, such that for each robot at each point in time between the respective start and destination times of the respective robot, a distance between the respective robot and the obstacle does not fall below a predetermined threshold; and
determining coordinated motions of the first and second robots from the respective start configuration to the respective destination configuration, such that at each point in time between the respective start and destination times of the first and second robots, a distance between the first and second robots does not fall below a predetermined threshold based on the determined initial motions.

12. The method of claim 11, wherein the coordinated motions of the first and second robots is determined such that the distance between the first and second robots does not fall below the predetermined threshold in the vicinity of the determined initial motions.

13. A method for operating at least one robot, the method comprising:
determining a motion of the at least one robot according to claim 1; and
controlling the at least one robot with the microprocessor to perform the determined motion.

14. A system for planning motion of at least one robot, the system comprising:
means for providing a start configuration of the robot, the start configuration comprising at least one start position of the robot, and for providing at least one destination configuration of the robot that comprises at least one destination position for the robot;
means for providing information of a motion of at least one obstacle in the workspace of the robot, the obstacle motion defining a position of the obstacle varying over time; and
means for determining a motion of the robot from the start configuration to the destination configuration, the robot motion defining a position of the robot over a time period from a start time to a destination time, such that at each point in time between the start time and the destination time, a distance between the robot and the obstacle does not fall below a predetermined threshold;
wherein determining the motion of the robot comprises employing at least one of:
a state space comprising a time dimension and at least one position dimension, or
a hyperspace comprising state transitions of the state space;
wherein at least one of the state space or the hyperspace is discretized; and
wherein determining the motion of the robot further comprises:
determining a first motion of the robot employing at least one of the state space or the hyperspace discretized at a first resolution, and
determining a subsequent motion of the robot employing a subspace of at least one of the state space or the hyperspace, wherein the subspace is at least one of in the vicinity of the first motion, or is discretized at a subsequent resolution finer than the first resolution.

15. An arrangement comprising:
at least one robot; and
a system for motion planning for the at least one robot according to claim 14.

16. A computer program product comprising source code stored on a non-transitory computer-readable medium, the source code, when executed on a microprocessor, causing the microprocessor to:
provide a start configuration of a first robot, the start configuration comprising at least one start position;
provide a destination configuration of the first robot, the destination configuration comprising at least one destination position;
provide information for a motion of at least one obstacle in the workspace of the first robot, the obstacle motion information defining a position of the obstacle varying over time; and
determine a motion of the first robot from the start configuration to the destination configuration, the robot motion defining a position of the first robot over a time period from a start time to a destination time;
wherein the robot motion is determined such that at each point in time between the start time and the destination time, a distance between the first robot and the obstacle does not fall below a predetermined threshold;
wherein determining the motion of the robot comprises employing at least one of:
a state space comprising a time dimension and at least one position dimension, or
a hyperspace comprising state transitions of the state space;
wherein at least one of the state space or the hyperspace is discretized; and
wherein determining the motion of the robot further comprises:
determining a first motion of the robot employing at least one of the state space or the hyperspace discretized at a first resolution, and
determining a subsequent motion of the robot employing a subspace of at least one of the state space or the hyperspace, wherein the subspace is at least one of in the vicinity of the first motion, or is discretized at a subsequent resolution finer than the first resolution.

* * * * *